Sept. 13, 1949.   J. C. DARNALL, JR   2,481,501
BOMB CONTAINER AND RELEASING MECHANISM
Filed March 4, 1941   4 Sheets-Sheet 1

INVENTOR
James C. Darnall, Jr.
ATTORNEY

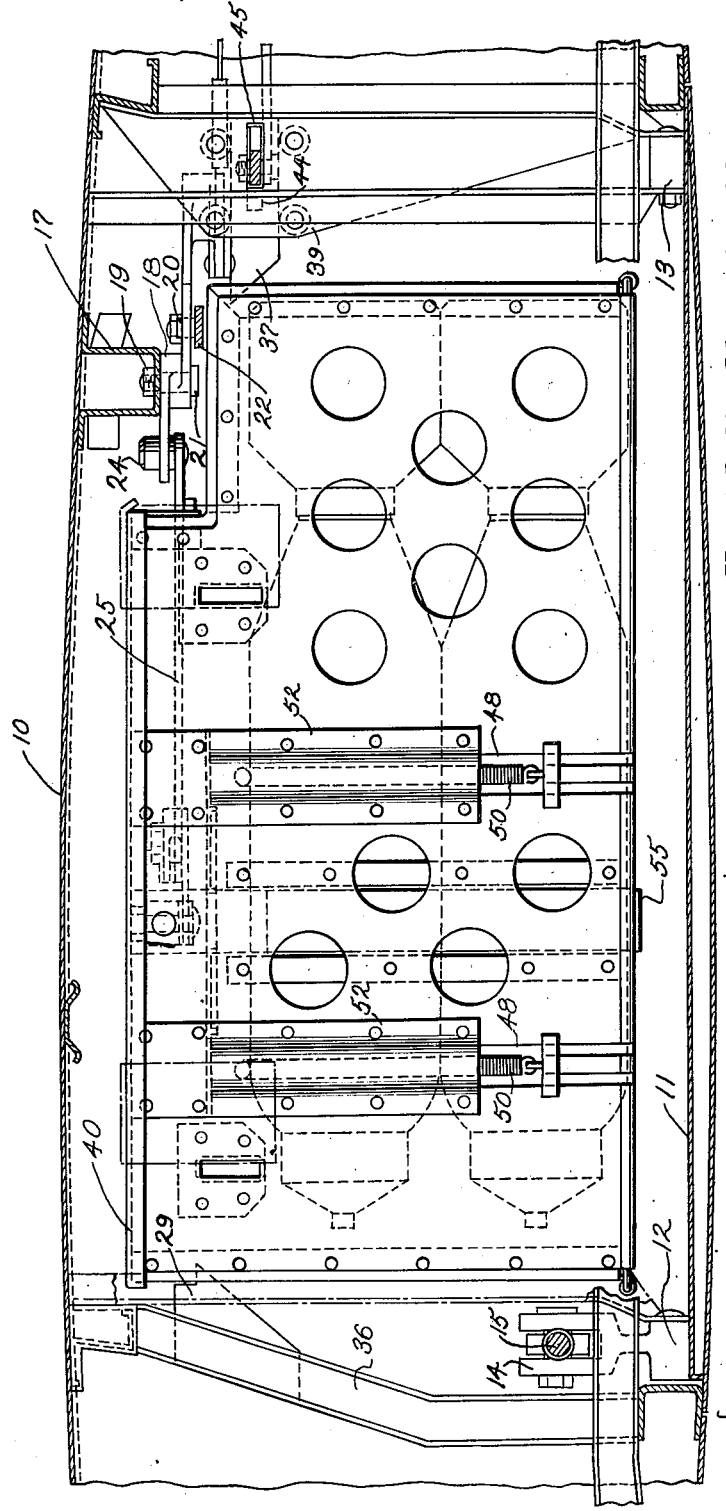

Sept. 13, 1949.   J. C. DARNALL, JR   2,481,501
BOMB CONTAINER AND RELEASING MECHANISM
Filed March 4, 1941   4 Sheets-Sheet 3
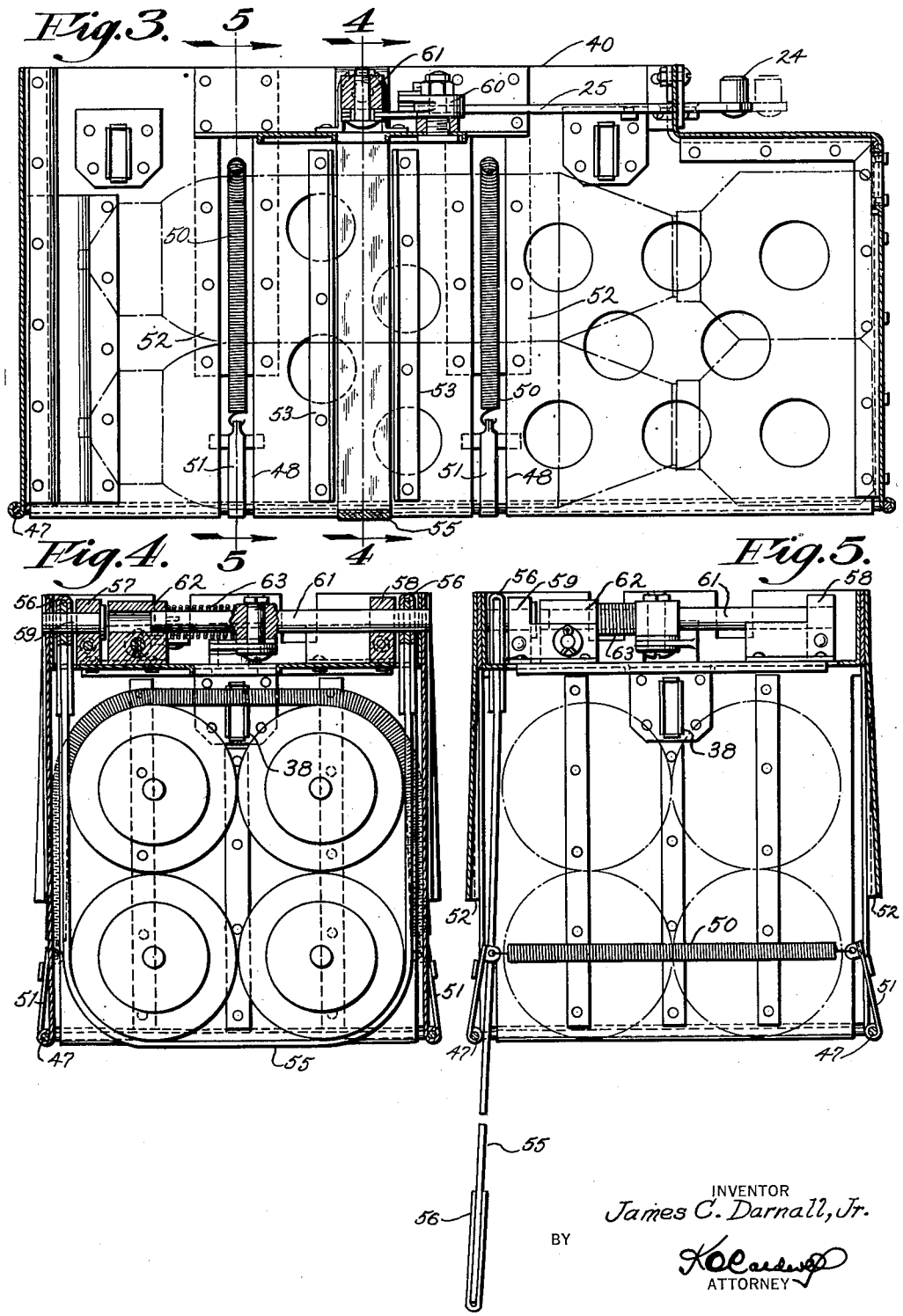
INVENTOR
James C. Darnall, Jr.
BY
ATTORNEY

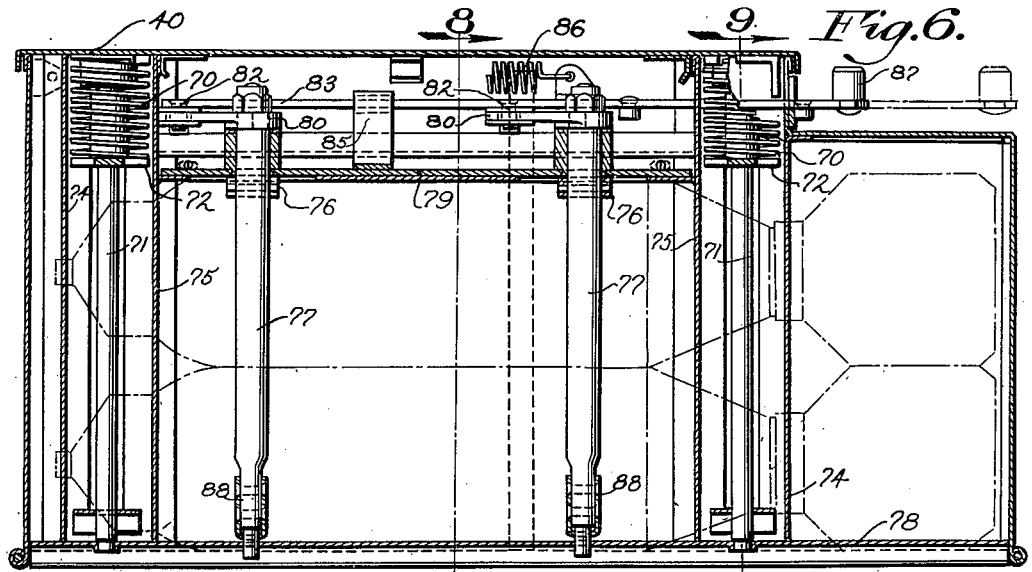

Patented Sept. 13, 1949

2,481,501

UNITED STATES PATENT OFFICE 2,481,501

BOMB CONTAINER AND RELEASING MECHANISM

James C. Darnall, Jr., Hyattsville, Md.

Application March 4, 1941, Serial No. 381,691

4 Claims. (Cl. 89—1.5)

(Granted under the act of March 3, 1883, as amended April 30, 1928; 370 O. G. 757)

This invention relates to a bomb containing and releasing apparatus, wherein the bombs may be released from the aircraft successively and in groups, as occasion may demand.

It is a specific object of my invention to provide a lightweight bomb container which is adapted to be inserted into a compartment formed in the wing structure of a small aircraft with releasing gear associated therewith, by means of which a group of bombs may be dropped simultaneously to blanket an area, and by means of which the release of the several groups of bombs in the several containers may be successively controlled. Each of the bombs which this container is adapted to hold has a fuse that is armed by the movement of the bomb during its fall, and in order that the bombs may be dropped in a safe condition I have provided a means whereby the containers may also be released so that the bombs will remain therein and will not therefore execute the type of movement necessary to arm the fuses, whereby the bombs will drop safely.

It is also an object of my invention to provide a bomb container having a releasing gear which is adapted to be inserted into the body of an aircraft, preferably in the wing of an aircraft, with mechanism associated therewith for operating the releasing gear attached to the container and with means for connecting the releasing gear of the container to the operating mechanism formed in the structure of the aircraft quickly and easily by merely properly inserting the container into a compartment formed in the wing of the aircraft.

It is a further object of my invention to provide a bomb container adapted to be inserted into the body of an aircraft with releasing mechanism associated therewith which will insure a positive ejection of the bombs from said container on release.

With the foregoing and other objects in view, the invention consists in the construction, combination and arrangement of parts hereinafter described and illustrated in the drawings, in which:

Fig. 2 is a fragmentary vertical, cross-sectional view through the wing taken substantially as shown by line 2—2 of Fig. 1, and shows a side elevation of the preferred form of the invention.

Fig. 3 is a vertical, sectional view taken on line 3—3 of Fig. 1.

Fig. 4 is a vertical, cross-sectional view taken on line 4—4 of Fig. 3.

Fig. 5 is a vertical, cross-sectional view taken on line 5—5 of Fig. 3.

Fig. 6 is a longitudinal, sectional view of a modification of the bomb container.

Fig. 7 is a fragmentary plan view of the container with the cover removed so as to show the actuating mechanism for the bomb-releasing latch.

Fig. 8 is a vertical, cross-sectional view taken on line 8—8 of Fig. 6, showing bombs lodged in the container with details of cam-like latching mechanism; and Fig. 9 is a vertical, sectional view taken on line 9—9 of Fig. 6, showing ejecting springs fully extended.

Figure 1:
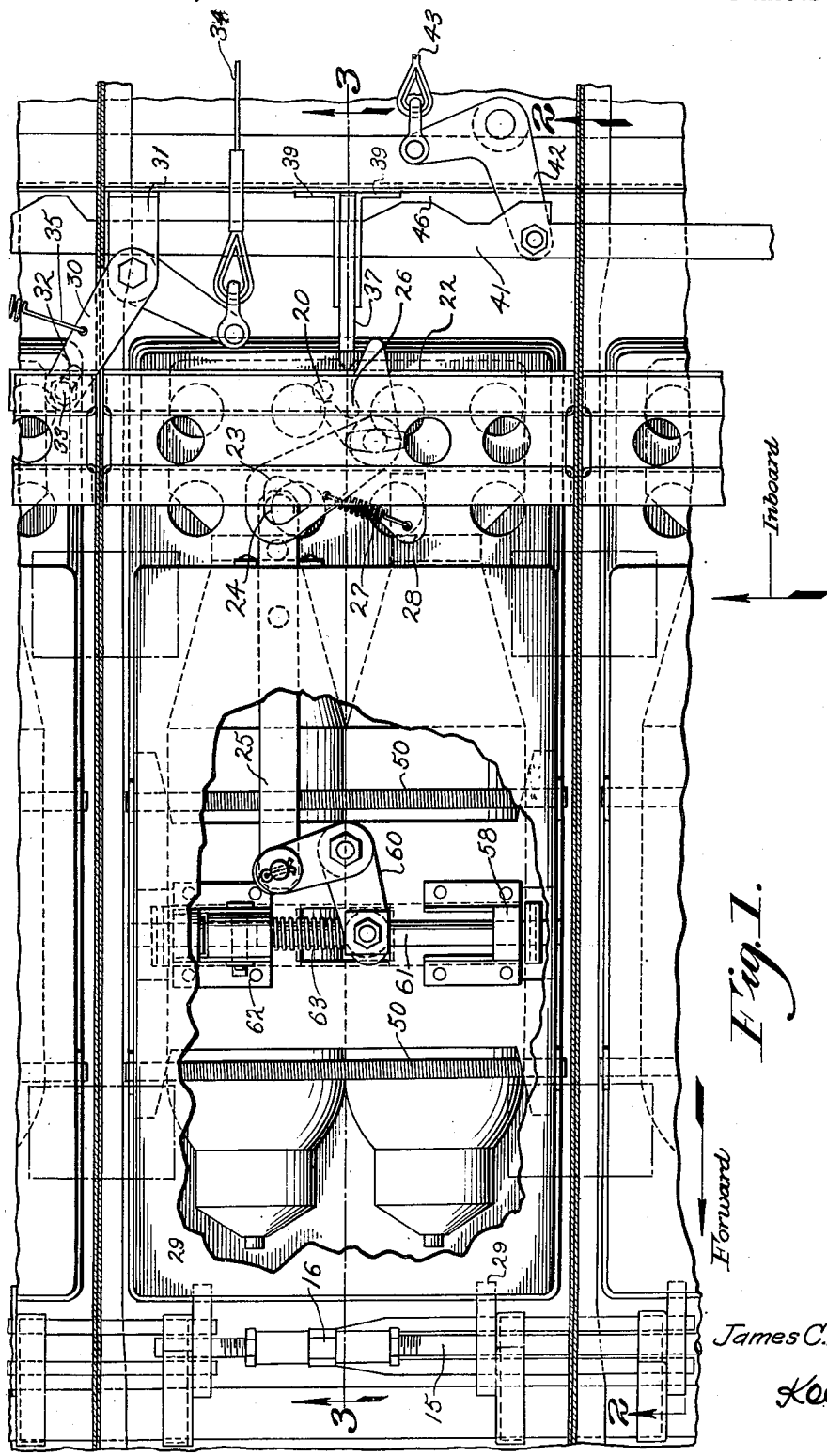
Fig. 1 is a fragmentary horizontal, sectional view of an aircraft wing, showing in plan the bomb container lodged therein, with part of its cover broken away to show the operating gear for release of the bombs.

Figs. 1 to 5, inclusive, illustrate the preferred form of my bomb containing and releasing mechanism, with Figs. 1 and 2 showing its preferred location in the wing of an aircraft, the outer upper surface of which is indicated generally at 10. A number of pockets, compartments, or the like are formed in the under surface of the wing, each adapted to receive a bomb container 40. A door 11 is hinged to the wing structure at one side of the compartment by the two hinges 12 and 13, so that the door when opened offers the least possible wind resistance. A door operating lever 14 is integrally formed with the part of the hinge 12 to which the door is fastened and has a forked end to which the operating rod 15 is pivotally secured. In order that each door may be operated simultaneously, the operating rods to each door lever are united by the turnbuckle arrangement indicated at 16. This turnbuckle is tapped threaded at both of its ends so as to receive each end of the adjoining operating rods and to provide an easy method of assembly and adjustment.

In each of the wing pockets a downwardly extending bracket 17 is welded or otherwise suitably secured to the inner surface of the upper side of the wing 10. This bracket 17 establishes a pivot for the bell crank lever 18, which is held in place by means of the flanged grip nut 19 and the bolt 21. One end of the lever is formed with a notched portion 26 which is adapted to be engaged by the pin 20 of the sliding bar 22 and operated thereby. The other end of the bell crank lever 18 has a triangular opening 23 formed therein which is adapted to engage the pin 24 projecting upwardly from the release operating bar 25 of the container. This end of the lever also has a coiled spring 27 secured thereto and to the bracket 28 so as to yieldably hold the lever in the position indicated in Fig. 1.

The sliding bar 22 is operated by means of another bell crank or L shaped lever 30 which is pivoted to the bracket 31 fastened to the wing structure. A longitudinal slot 32 is cut in one end of this lever which is held to the sliding bar 22 by means of the pin 33 positioned so as to be movable in this slot. The other end of the lever is shackled to the operating halyard 34 which leads to the releasing mechanism in the cockpit of the aircraft. The spring 35 retains the slide bar and operating bell crank lever 30 in the position illustrated in Fig. 1.

Two or more rigid keepers 29 are each secured to the wing spar 36 near the top of the bomb container compartment at one side thereof so as to project inwardly a distance sufficient to engage keeper slots formed in the end of the bomb container 40. The other side of the compartment is appropriately provided with a keeper latch 37 positioned between the brackets 39 and yieldably held in the position indicated in the drawings by a suitable spring mechanism (not shown). That is, this latch 37 is movable between the brackets in and out of a keeper slot 38 formed in the side of the bomb container 40 by means of the trip bar 41. This trip bar 41 is operated or moved by a pivoted L or bell crank lever 42, which has one end secured to the bar and the other end secured to an operating halyard 43, which also leads to suitable control gear located in the cockpit of the aircraft. The trip bar is slidable in the slots 44 formed in each of the brackets 39 and also in slot 45 formed in the keeper latch 37. The cam surface 46 of the bar 41 engages one side of the latch slot 45, retracting the latch from the engaging position with the container 40, whereby the container and bombs may be released.

The details of the wing structure and door operating mechanism are not specifically involved in this invention, and are not illustrated or disclosed with any greater degree of particularity than is necessary for a complete understanding of my invention, and it should be understood that I make no claim to wing structure per se.

The bomb container and releasing mechanism comprising my invention will now be described. I have illustrated a bomb container 40 having four bombs positioned therein and held in place by a flexible band, strap, or the like, 55, which is stretched over the open end of the container. Each end of this strap is provided with reinforcing member 56 which permits the strap to be easily inserted into the bomb casing between the guide blocks 57, 58, and the side of the container. One end of the strap is permanently secured to the container by means of the pin 59, while the other end may be released by the operation of a mechanism to be described.

Since it is desirable under certain circumstances to release these bombs when the aircraft is in a climb or in a dive, or being otherwise maneuvered, some means must be provided for exerting a force on these bombs, in addition to gravitational forces or the forces of acceleration, to insure a positive ejection of the bombs from the container. In order to provide for the positive ejection of the bombs from the container, irrespective of the other forces present, I have formed two longitudinal slots 48 in each side of the container, and have stretched a resilient member such as a "bungee" cord or coil spring 50 across the open end of the container at said slots. These spring members are secured to the container at the longitudinal slots by means of two supporting members 51, positioned in the slots and secured to the rod 47 about which the beaded edge of the container is formed. The channel bars 52 are riveted to each side of the container over the slotted area to give strength and rigidity to the container naturally weakened at the slotted portion, and also to provide a channel to receive the spring member 50 when the same are stretched to the position shown in Figs. 3 and 4. The angle bars 53 are also riveted to the outside surface of the container to provide a retaining channel for the flexible strap 55.

The releasing mechanism for releasing the bombs is placed at the top of the container and comprises a pivoted L shaped or bell crank lever 60, one end of which is secured to the release operating bar 25 slidable in a slot formed in one end of the container. The other end of the bell crank lever 60 is pivoted to the central block portion of the release plunger 61, which is slidable in the two guide blocks 62 and 58. A coiled spring 63 is positioned about one end of the plunger 61 between the guide 62 and the central block portion of the release plunger 61 to which the bell crank lever 60 is pivoted, so that one end of the plunger 61 may be yieldably held in the position in which its end projects through an opening formed in the reinforced end of the strap 55 and into an opening formed in the side of the container. The bombs are thus held in place in the container between the spring member 50 and the flexible strap 55 so that upon release of the strap the bombs will be ejected from the casing by the action of the springs 50.

The operation of my bomb containing and releasing mechanism will now be described. The bombs are loaded into the container 40 by merely inverting the container and inserting the bombs so as to compress the springs 50. The spring pressed plunger 61 is then retracted so that the strap 55 may be inserted into the space between the guide block 58 and the side of the casing and securely held there by the plunger 61. The container is thus loaded and ready to be inserted into the wing compartment of the aircraft.

The door 11 of the wing compartment is opened and the bombs and container are inserted therein with the nose of the bomb pointing toward the leading edge of the wing. The container is inserted so that the pin 24 of the release operating bar 25 will fit into the triangular opening 23 formed in the bell crank lever 18 and will be held in place by means of the keepers 29 and the keeper latch 37. It should be noted that the gear is now properly connected to its operating mechanism, merely by inserting the bomb container into the wing compartment, no other connections being necessary. This is an important feature of my invention, since considerable time is saved in loading these containers into the wing structure by providing the connecting mechanism which I have disclosed.

As shown in Fig. 1, the bomb containers are mounted side by side in the wing compartments so that the bombs in each compartment may be released successively by the halyard 34, which leads to a suitable operating lever positioned in the cockpit of the aircraft. The operation of this lever will determine the number of compartments emptied, since movement of the halyard is transmitted directly to the sliding bar 22 by means of the bell crank 30, and since the distance between each of the pins 20 is adjusted so that the bell crank levers 18 will be successively engaged to operate each releasing bar 25.

These pins 20 engage the notched portions 26 of the bell crank levers so as to move each lever about its pivotal axis and pull the release operating bar 25 outwardly from the container. One end of this bar is pivoted to the L shaped lever 60 which is connected to the plunger 61, which retracts the plunger from its extended position, compressing the spring 63.

The movement of the plunger will release one end of the strap 55 and the bombs will be ejected by the springs 50. In the drawing, I have disclosed means for releasing only one end of the strap. However, it may, in some cases, be more desirable to let the strap fall with the bombs rather than have any loose ends dangling from the wing; hence a release mechanism may be easily designed so that both ends of the plunger are attracted to release both ends of the strap.

A modified form of my invention is illustrated in Figs. 6 to 9, inclusive. In this modification two helical spring members 70, Fig. 9, are provided, one at each end of the open container 40 and positioned substantially in the middle of the container, as shown in Fig. 8. A U-shaped channel bar 78 is secured to the container at the open end thereof, extending along the major axis of the container so as to provide a support for one end of the rods 71, the other end of which is suitably secured to the cover of the container. The plate 72 is secured to each of the rods so as to be slidable thereon, and the spring 70 is positioned about the rod so as to be compressed between the plate member and the closed end of the container.

Two U-shaped channel bars 73 are secured to each of these plates 72 on opposite sides of the rod 71 and extend parallel to major axis of the container. The frame members 74 and 75 are secured to the container by suitable brackets, Fig. 7, to provide a partial enclosure for each spring rod and plate assembly. The two bearing members 76 are secured to a supporting plate 79, which is in turn fastened to the frame members 75. The release operating shafts 77 are supported by these bearing members and the U-shaped channel 78 so as to be rotatable therein, and are provided with an operating lever 80 secured to the upper end. The end of each lever 80 is provided with a longitudinal slot 81 which is adapted to engage the pins 82 of the trip bar 83 slidably supported in the container by means of a slot 84 formed in one end thereof and the guide 85. This trip bar is held in its attracted position by means of the spring 86 and is provided with an upwardly extending pin 87, which is adapted to fit into the triangular opening formed in one end of the L shaped or bell crank lever 18, which is pivotally secured to the wing structure. The opposite ends of the release operating shafts have transverse bomb-holding plates 88 joined thereto, adapted to release the bombs when rotated through an angle of 90°.

In the operation of this modification, the bombs are inserted into the container and rest on the frame formed by the channel bars 73 and the plates 72, compressing the helical spring 70, as illustrated in Figs. 6 and 8. The holding plates 88 are then rotated 90° so as to extend transversely of the container to engage the outer surface of the lower bombs of each row. The spring 86 retains the holding plate in this position. To release the bombs the trip bar 83 is pulled outwardly of the container, as shown in broken lines in Fig. 7, and the operating levers 80 are also pulled over to the position shown in the broken lines by pin and slot connection. Movement of the levers 80 rotates the shaft 77 and the holding plates 88, so that the bombs may be ejected by the action of the springs 70.

It should be understood that the above description of the detailed features embodied in my invention have been set forth in order to comply with the statutory requirements only, and the details of the invention as disclosed are to be taken as a description and not in a limiting sense. Two embodiments of my invention have been disclosed, and as at present appear to represent the preferred form of my invention. However, changes in the number and arrangement of the parts may be made by those skilled in the art without departing from the nature of the invention, within the scope of what is hereinafter claimed.

The invention described herein may be manufactured and/or used by or for the Government of the United States of America for governmental purposes without the payment of any royalties thereon or therefor.

I claim:

1. In combination with an aircraft wing having a plurality of compartments arranged on the under side thereof, a plurality of open sided containers, each adapted to hold a plurality of aircraft bombs, each having an ejector spring stretched across the open end thereof, and each releasably held within one of said compartments, flexible straps for holding said bombs within each of said containers against the action of said ejector springs, a spring pressed plunger rod attached to each container so as to engage an opening formed in the end of each of said straps so as to releasably secure said strap to said container, a pivoted bell crank lever operatively connected to each rod having an operating bar secured to the other end thereof with an upwardly extending pin formed thereon, and an operating lever pivoted to said wing structure in each compartment having an opening formed in one end thereof adapted to receive the upwardly extending pin formed on said rod, whereby the operating mechanism in said wing structure may be removably connected to the releasing gear attached to each of said containers merely by inserting said container into said compartment.

2. The invention as defined in the above claim, characterized further by the addition thereto of a sliding bar operatively positioned in said wing structure and extending lengthwise of the wing along an area in which the compartments are formed, a plurality of spaced pins secured to said bar to successively engage the free end of said operating lever as the bar slides in the wing structure, and means for sliding said bar so that the simultaneous ejection of the bombs in each container may be successively controlled.

3. An open sided bomb container for aircraft bombs having holding and ejecting means formed therein, comprising a frame slidably supported therein having a guide means at each end therefor, a coil spring formed about each of said guide means and positioned between said frame and the top of said container so that the frame will be held outwardly of the container by the action of said springs, a pair of latch plates extending transversely of the container at the base thereof when in one position for holding the bombs in the container between the walls thereof, the frame and the latch plates to prevent them from jarring, due to the vibration set up in said aircraft, and means for rotating said latch plates through 90° to release said bombs.

4. In an aircraft body portion, a series of compartments formed therein, latching means in each of said compartments comprising a spring biased locking member, a series of open sided containers, one of said containers held in each of said compartments by said latching means, a plurality of layers of aircraft bombs placed in each of said containers, spring ejecting means in each of said containers for ejecting said bomb layers, retaining means in each of said containers for holding said bomb layers against the action of said spring ejecting means, a first linkage means mounted on said body portion and carrying a series of pins spaced at different intervals, said pins operating said retaining means in said containers in sequence to release said bombs in each of said containers in sequence when said first linkage means is actuated, a second linkage means mounted on said body portion and carrying a series of cams, said cams actuating said spring biased locking members of said latching means in said compartments to permit all of said containers to be ejected simultaneously when said second linkage is operated.

JAMES C. DARNALL, JR.

REFERENCES CITED

The following references are of record in the file of this patent:

UNITED STATES PATENTS

| Number | Name | Date |
|---|---|---|
| 9,042 | Paine | Jan. 13, 1880 |
| 498,070 | Monaghan | May 23, 1893 |
| 1,172,542 | McMullen | Feb. 22, 1916 |
| 1,237,890 | Fernandez | Aug. 21, 1917 |
| 1,243,556 | Reynolds | Oct. 16, 1917 |
| 1,417,500 | Coley et al. | May 30, 1922 |
| 1,514,410 | Verville | Nov. 4, 1924 |
| 2,069,996 | Carleton et al. | Feb. 9, 1937 |
| 2,137,056 | Liegeois | Nov. 15, 1938 |
| 2,250,240 | Steuerlein | July 22, 1941 |
| 2,342,022 | Trimbach | Feb. 15, 1944 |

FOREIGN PATENTS

| Number | Country | Date |
|---|---|---|
| 460,150 | France | Sept. 27, 1913 |
| 638,851 | France | Feb. 28, 1928 |
| 801,194 | France | May 16, 1936 |
| 831,665 | France | June 13, 1938 |
| 29,482 | Great Britain | Aug. 28, 1913 |
| 129,161 | Great Britain | July 10, 1919 |
| 326,181 | Great Britain | Mar. 3, 1930 |